(12) United States Patent
Middleton

(10) Patent No.: US 12,107,465 B2
(45) Date of Patent: Oct. 1, 2024

(54) MOTOR USING PERMANENT MAGNETS AND INDUCTION WINDINGS FOR USE WITH AN ELECTRICAL SUBMERSIBLE PUMP

(71) Applicant: ElectromagnetiX LLC, Shawnee, OK (US)

(72) Inventor: Christopher Martin Middleton, Meeker, OK (US)

(73) Assignee: Electromagnetix LLC, Shawnee, OK (US)

( * ) Notice: Subject to any disclaimer, the term of this patent is extended or adjusted under 35 U.S.C. 154(b) by 148 days.

(21) Appl. No.: 17/447,033

(22) Filed: Sep. 7, 2021

(65) Prior Publication Data

US 2022/0077732 A1  Mar. 10, 2022

Related U.S. Application Data

(60) Provisional application No. 62/706,740, filed on Sep. 7, 2020, provisional application No. 62/706,739, filed on Sep. 7, 2020.

(51) Int. Cl.
| | |
|---|---|
| *H02K 1/27* | (2022.01) |
| *E21B 43/12* | (2006.01) |
| *F04D 13/06* | (2006.01) |
| *F04D 13/08* | (2006.01) |
| *F04D 13/10* | (2006.01) |

(Continued)

(52) U.S. Cl.
CPC ........... *H02K 15/03* (2013.01); *E21B 43/128* (2013.01); *F04D 13/06* (2013.01); *F04D 13/086* (2013.01);

(Continued)

(58) Field of Classification Search
CPC ...... E21B 43/128; F04D 13/086; F04D 13/06; F04D 13/10; H02K 1/16; H02K 1/272;

(Continued)

(56) References Cited

U.S. PATENT DOCUMENTS 4,358,696 A  *  11/1982  Liu ..................... H02K 21/46
                                                310/156.56
4,358,697 A  *  11/1982  Liu ..................... H02K 1/2766
                                                310/156.56

(Continued)

FOREIGN PATENT DOCUMENTS

DE           4008639 A1      9/1991
KR        101573690 B1  *   4/2015   .............. H02K 1/27

OTHER PUBLICATIONS

KR-101573690-B1 English Translation (Year: 2015).*

(Continued)

*Primary Examiner* — Dominick L Plakkoottam
(74) *Attorney, Agent, or Firm* — Hall Estill Law Firm

(57) ABSTRACT

An ESP including a motor section for driving the ESP. The motor section includes a stator with winding channels disposed axially therein and windings disposed in the winding channels to generate a stator electromagnetic field. The motor section also includes a rotor rotatably disposed in the stator. The rotor having a body with multiple permanent magnets to generate a constant magnetic field and rotor bars disposed axially in the rotor that cause an induced electromagnetic field when subjected to the stator electromagnetic field. Alternatively, the rotor includes multiple permanent magnets to generate a constant magnetic field wherein the stator electromagnetic field and the constant magnetic field create a two pole magnetic field for the motor section. A method of determining a layout of multiple permanent magnets disposed axially in a rotor to generate a desired constant magnetic field and produce a two pole magnetic field for the ESP and constructing the ESP.

18 Claims, 3 Drawing Sheets

(51) Int. Cl.
| | |
|---|---|
| *H02K 1/16* | (2006.01) |
| *H02K 1/18* | (2006.01) |
| *H02K 1/272* | (2022.01) |
| *H02K 3/48* | (2006.01) |
| *H02K 5/132* | (2006.01) |
| *H02K 7/14* | (2006.01) |
| *H02K 15/02* | (2006.01) |
| *H02K 15/03* | (2006.01) |

(52) U.S. Cl.
CPC ............... *F04D 13/10* (2013.01); *H02K 1/16* (2013.01); *H02K 1/165* (2013.01); *H02K 1/182* (2013.01); *H02K 1/272* (2013.01); *H02K 3/48* (2013.01); *H02K 5/132* (2013.01); *H02K 7/14* (2013.01); *H02K 15/024* (2013.01)

(58) Field of Classification Search
CPC ........ H02K 7/14; H02K 15/024; H02K 15/03; H02K 2201/03; H02K 5/132
See application file for complete search history.

(56) References Cited

U.S. PATENT DOCUMENTS

| | | | |
|---|---|---|---|
| 5,036,235 A | | 7/1991 | Kleckner |
| 6,727,627 B1* | | 4/2004 | Sasaki .................... H02K 21/46 |
| | | | 310/156.53 |
| 8,770,271 B2 | | 7/2014 | Fielder et al. |
| 9,621,014 B2 | | 4/2017 | Yang et al. |
| 10,385,856 B1* | | 8/2019 | Shakirov ............... F04D 13/086 |
| 2007/0096577 A1* | | 5/2007 | Guven ................. H02K 1/2766 |
| | | | 310/156.56 |
| 2013/0169074 A1 | | 7/2013 | Hussain et al. |
| 2013/0307358 A1* | | 11/2013 | Parviainen ............... H02K 9/06 |
| | | | 310/52 |
| 2014/0191607 A1* | | 7/2014 | Huang ..................... H02K 1/27 |
| | | | 310/156.08 |
| 2015/0054376 A1* | | 2/2015 | Sheth ....................... H02K 3/48 |
| | | | 310/214 |
| 2016/0168964 A1* | | 6/2016 | Li .......................... F04D 29/669 |
| | | | 417/420 |
| 2016/0169231 A1* | | 6/2016 | Michelassi ................ F04D 1/06 |
| | | | 417/423.12 |
| 2017/0264179 A1* | | 9/2017 | Khotsyanov ........... H02K 5/132 |
| 2020/0304002 A1* | | 9/2020 | Amjad ................... H02K 1/2783 |
| 2021/0199099 A1* | | 7/2021 | Clingman ............... F04B 47/06 |
| 2021/0211004 A1* | | 7/2021 | Wang ................... H02K 1/2746 |

OTHER PUBLICATIONS

EP 3203609 Original plus English Translation (Year: 2016).*
ISA; "International Search Report and Written Opinion"; Feb. 14, 2022; 18 pages.

* cited by examiner

MOTOR USING PERMANENT MAGNETS AND INDUCTION WINDINGS FOR USE WITH AN ELECTRICAL SUBMERSIBLE PUMP

CROSS-REFERENCE TO RELATED APPLICATIONS

The present application is a conversion of U.S. Provisional Application having U.S. Ser. No. 62/706,739, filed Sep. 7, 2020 and U.S. Provisional Application having U.S. Ser. No. 62/706,740, filed Sep. 7, 2020, which claims the benefit under 35 U.S.C. 119(e). The disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Disclosure

The present disclosure relates to a low pole-count line-start motor for use with an electrical submersible pump (ESP) using a rotor that incorporates magnetic circuits of an induction motor and a permanent magnet.

2. Description of the Related Art

ESPs are commonly used in the oil industry to provide artificial lift in wells where pressure is insufficient to produce oil to the surface. ESP's typically operate using induction motors or permanent magnet motors, where the latter has improved performance over the former but require elaborate controls in order to maintain synchronous operations. This means that the rotor has to travel with the magnetic field in the stator which results in the motor having little starting torque and can stall under erratic loads. ESPs have to fit down in a wellbore and are thus subject to certain size constraints. The size constraints have provided limitations as to the type and design capable for motors used in ESPs.

Accordingly, there is a need for a low pole-count line-start motor for use with an ESP using a rotor that incorporates magnetic circuits of an induction motor and a permanent magnet.

SUMMARY OF THE DISCLOSURE

The present disclosure is directed to an electric submersible pump (ESP). The ESP includes a motor section for driving the ESP. The motor section includes a stator with winding channels disposed axially therein and windings disposed in the winding channels to generate a stator electromagnetic field when power is supplied to the ESP. The motor section also includes a rotor rotatably disposed in the stator. The rotor having a body with multiple permanent magnets disposed axially in the rotor to generate a constant magnetic field and rotor bars disposed axially in the rotor that cause an induced electromagnetic field when subjected to the stator electromagnetic field.

The present disclosure is also directed to an electric submersible pump (ESP) having a motor section for driving the ESP. The motor section includes a stator with winding channels disposed axially therein and windings disposed in the winding channels to generate a stator electromagnetic field when power is supplied to the ESP. The motor section includes a rotor rotatably disposed in the stator having a body. The rotor includes multiple permanent magnets disposed axially therein to generate a constant magnetic field wherein the stator electromagnetic field and the constant magnetic field create a two pole magnetic field for the motor section.

The present disclosure is further directed to a method of determining a layout of multiple permanent magnets disposed axially in a rotor of an electric submersible pump (ESP) to generate a desired constant magnetic field and produce a two pole magnetic field for the ESP and constructing the ESP.

DETAILED DESCRIPTION OF THE DISCLOSURE

Figure 1:
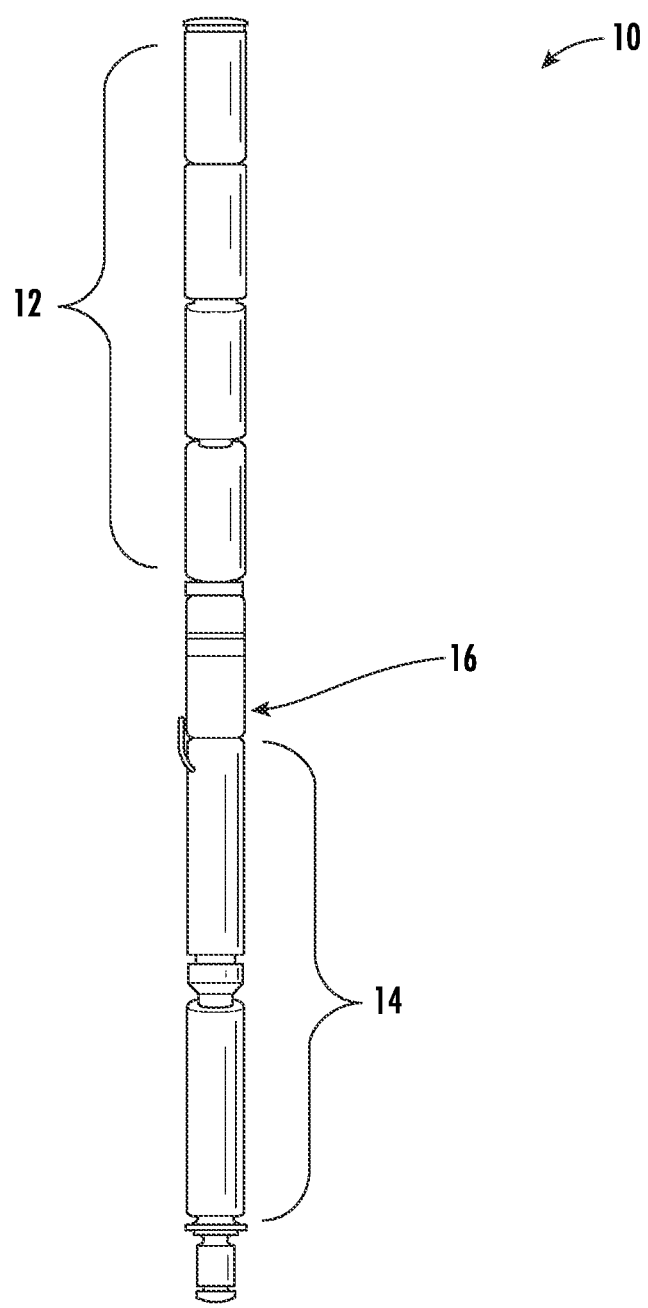
FIG. 1 is a side elevation view of an electric submersible pump (ESP) constructed in accordance with the present disclosure.

Referring now to the drawings, FIG. 1 and the present disclosure is directed to an electrical submersible pump (ESP) 10 that includes a centrifugal pump 12 driven by a motor section 14 that is stabilized using electromagnetics. The ESP 10 can also include a seal section 16 that separates the motor section 14 from centrifugal pump 12 to equalize internal pressure of lubricant within the motor section 14 to the pressure of the wellbore.

Figure 2:
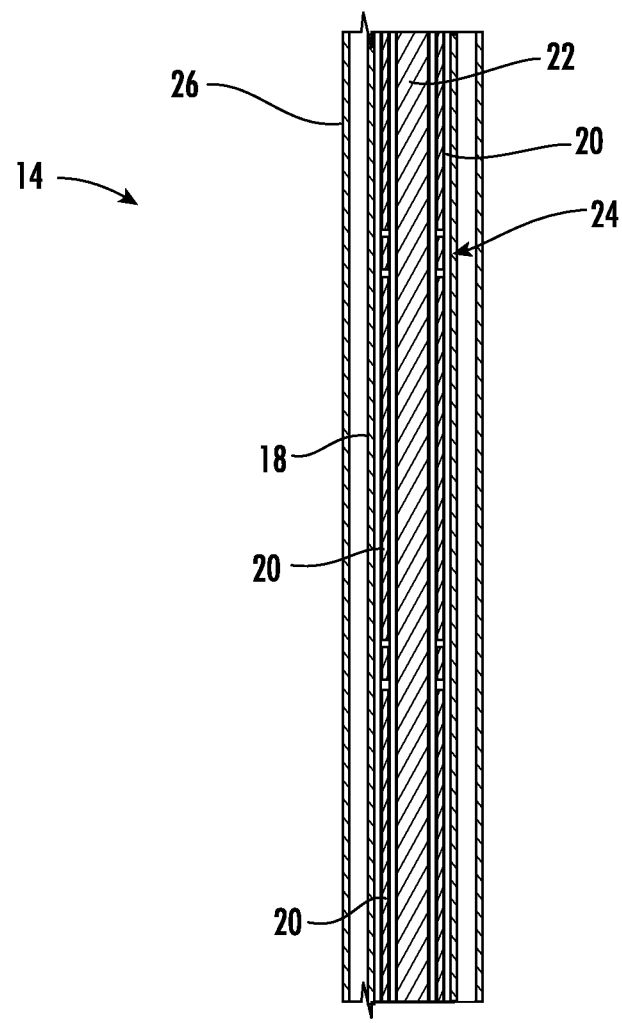
FIG. 2 is side elevation view of a motor section of the ESP constructed in accordance with the present disclosure.

FIG. 2 shows the motor section 14 of the ESP 10. The motor section 14 includes a stator 18, at least one rotor 20 rotatably disposed within the stator 18 and a shaft 22 that extends at least partially through the rotor 20 (and motor section 14) and the stator 18. The shaft 22 also extends through the seal section 16 and at least partially into the centrifugal pump section 12 to operate various parts of the centrifugal pump section 12. The shaft 22 is securely disposed to the rotor 20 so that when the rotor 20 turns in the stator 18, the shaft 22 turns as well. The motor section 14 can have multiple rotors 20 rotatably disposed in the stator 18.

Figure 3:
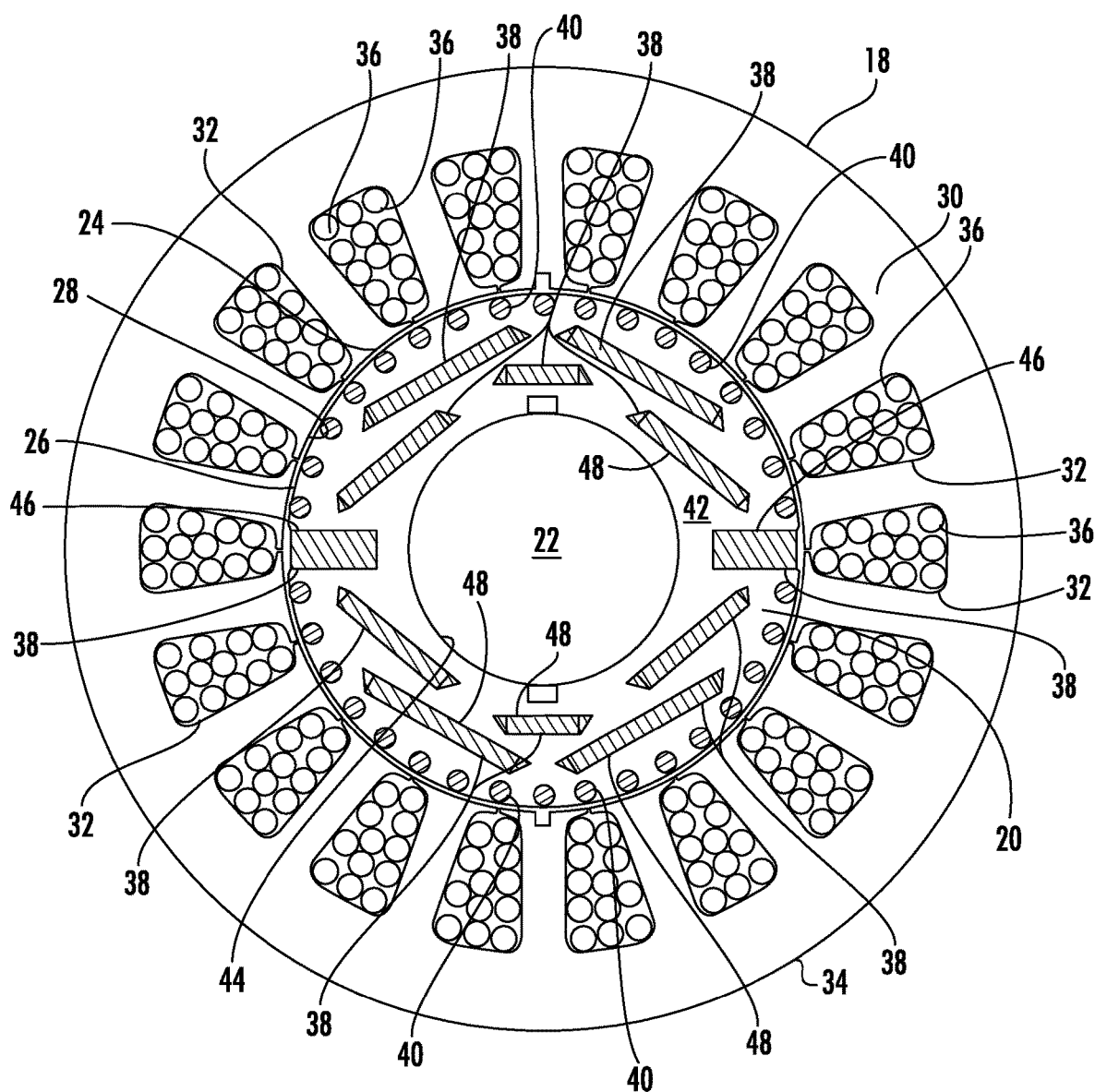
FIG. 3 is a cross-sectional view of a motor section of the ESP constructed in accordance with the present disclosure.

FIG. 3 shows a cross sectional view of a part of the stator 18, the rotor 20 and the shaft 22. An air gap 24 is shown disposed between an outside portion 26 of the rotor 20 and an inner surface 28 of the stator 18. The stator 18 includes a body 30 with winding channels 32 that extend axially through the body 30 of the stator 18. The body 30 of the stator 18 is part of the stator 18 that is between the inner surface 28 and an outer surface 34 of the stator 18. The winding channels 32 allow for a place where windings 36 can be placed within the body 30 of the stator 18 to create a stator electromagnetic field across the air gap 24. The rotor 20 (or rotors, if the motor section 14 includes multiple rotors) includes multiple permanent magnets 38 and rotor bars 40 disposed axially in a body 42 of the rotor 20. The body 42 of the rotor 20 extends from the outer surface 26 of the rotor 20 to an inner surface 44 of the rotor 20. The permanent magnets 38 in the rotor 20 creates a constant magnetic field. The stator electromagnetic field generated from the stator 18 and the constant magnetic field in the rotor 20 cooperate to generate torque between the stator 18 and the rotor 20 to turn the rotor 20.

When power is supplied to the windings 36 in the stator 18, the stator electromagnetic field generated from the stator 18 interacts with the constant magnetic field in the rotor 20 and the rotor bars 40 disposed in the rotor 20 are subjected to the stator electromagnetic field. A current is then generated in the rotor bars 40, which creates an induced electromagnetic field and the rotor 20 begins to turn. When the rotor 20 first begins to turn, its speed is lower than the speed of the stator electromagnetic field. The induced electromagnetic field provides the start torque for the rotor 20 until the motor section 14 reaches the operating point where the constant magnetic field is in synchronous operation with the stator electromagnetic field, or until the speed of the rotor 20 matches the speed of the stator electromagnetic field. The permanent magnets 38 improves the efficiency and power factor over an ESP that only uses induction winding in the rotor 20.

The multiple permanent magnets 38 disposed in the body 42 of the rotor 20 have to be shaped and spaced within the rotor body 42 so that the desired constant magnetic field is generated in the rotor 20 and the circuit is completed. If the permanent magnets 38 are not spaced properly each magnet 38 could easily short to itself. The permanent magnets 38 can be positioned around the body 42 of the rotor 20. A single magnet disposed around the rotor body 42 is very unlikely to work because it would provide too high of an impedance to the creation of the induced electromagnetic field. The rotor bars 40 are disposed in the rotor body 42 outside (i.e. closer to the outside portion 26 of the rotor 20) of at least a portion of the permanent magnets 38. The geometric arrangement of the permanent magnets 38 and the amount of rotor body 42 not occupied with permanent magnets 38 allows for the induced electromagnetic field to be created by the presence of the rotor bars 40. The space in the rotor body 42 free of the magnets also provides a certain level of impedance that permits the permanent magnets 38 to work in concert to generate the constant magnetic field through the rotor 20, and not short to themselves. In one embodiment, the rotor bars 40 are positioned immediately adjacent to the outside portion 26 of the rotor 20.

The number of permanent magnets 38 disposed in the rotor 20 depends on the shape, size and power of the magnets 38. It should be understood that each of these permanent magnets 38 are in its own space in the rotor body 42. Further, the layout of the permanent magnets 38 would be symmetrical so that the forces are balanced in the rotor 20. In one embodiment, if you cut the cross-sectional view of the rotor 20 in half, each side would be a mirror image of the other. In one exemplary embodiment, at least four permanent magnets 38 are disposed in the rotor 20 with enough of the body 42 of the rotor 20 free of the magnets 38 to provide the correct level of constant magnetic field and create the induced electromagnetic field to operate the motor section 14 of the ESP 10 as intended. In a further embodiment, at least six permanent magnets 38 are disposed in the rotor 20 with enough of the body 42 of the rotor 20 free of the magnets 38 to provide the correct level of constant magnetic field and create the induced electromagnetic field to operate the motor section 14 of the ESP 10 as intended. In an even further embodiment, at least eight permanent magnets 38 are disposed in the rotor 20 with enough of the body 42 of the rotor 20 free of the magnets 38 to provide the correct level of constant magnetic field and create the induced electromagnetic field to operate the motor section 14 of the ESP 10 as intended. In yet another embodiment, at least ten permanent magnets 38 are disposed in the rotor 20 with enough of the body 42 of the rotor 20 free of the magnets 38 to provide the correct level of constant magnetic field and create the induced electromagnetic field to operate the motor section 14 of the ESP 10 as intended. In an even further embodiment, at least twelve permanent magnets 38 are disposed in the rotor 20 with enough of the body 42 of the rotor 20 free of the magnets 38 to provide the correct level of constant magnetic field and create the induced electromagnetic field to operate the motor section 14 of the ESP 10 as intended.

Another unique aspect of the motor section 14 described herein is that it is designed as a 2-pole magnetic field. To accomplish this feat, two of the magnets 38 are disposed in the rotor 20 such that a portion of the magnet 38 is exposed to the air gap 24. Each one of the exposed magnets 46 is disposed on the opposite side of the rotor 20 from each other. One of the exposed magnets 46 is the north pole of the generated constant magnetic field and the other exposed magnet 46 is the south pole of the generated constant magnetic field. In one embodiment, only a portion of the exposed magnets 46 would not be positioned inside of the rotor bars 40 in the body 42 of the rotor 20 in a radial direction. All of the other permanent magnets 38 (nonexposed magnets 48) in any given configuration would be disposed inside of the rotor bars 40 in a radial direction inside the rotor body 42. In a further embodiment, the nonexposed magnets 48 can be distributed in a first level of nonexposed magnets 48 and a second level of nonexposed magnets 48 wherein the first level is disposed closer to the inner surface 44 of the rotor 20. In an even further embodiment of the present disclosure, there could be more levels of nonexposed magnets 48 distributed in the body 42 of the rotor 20.

The present disclosure is also directed to a method of designing the components of the ESP 10 and/or constructing the ESP 10 with the rotor 20 and stator 18 described herein. The geometry or layout of the permanent magnets 38 disposed in the rotor 20 can be determined so that the desired constant magnetic field is generated and a two pole magnetic field will be created in the ESP 10. The number of permanent magnets 38 to be used can also be determined.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. An electric submersible pump (ESP), the ESP comprising:
   a motor section for driving the ESP, the motor section including:
      a stator with winding channels disposed axially therein and windings disposed in the winding channels to generate a stator electromagnetic field when power is supplied to the ESP;
      a rotor rotatably disposed in the stator having a body;
      multiple permanent magnets disposed axially in the rotor to generate a constant magnetic field wherein at least one of the permanent magnets is an exposed permanent magnet having a portion of the at least one exposed permanent magnet exposed to an air gap between the rotor and the stator, the at least one exposed permanent magnet causing a magnetic field that is tangential to the rotor, some of the permanent magnets having a portion of the body of the rotor disposed between the permanent magnets wherein the portion of the body of the rotor disposed between the permanent magnets has a first permanent magnet disposed inside of the portion of the body of the rotor in a radial direction and a second permanent magnet disposed outside of the portion of the body of the rotor in the radial direction;

rotor bars disposed axially in the rotor that cause an induced electromagnetic field when subjected to the stator electromagnetic field, the rotor bars disposed therein around an outer portion of the body of the at least one exposed permanent magnet disposed in the rotor circumferentially between a plurality of the rotor bars and between nonexposed permanent magnets, and the rotor bars located radially inside of an outer radial periphery of the at least one exposed permanent magnet.

2. The ESP of claim 1 wherein some of the permanent magnets are the nonexposed permanent magnets and these nonexposed permanent magnets are disposed fully within the body of the rotor.

3. The ESP of claim 1 wherein the rotor bars are positioned in the rotor entirely outside of all but two of the permanent magnets in the radial direction.

4. The ESP of claim 2 wherein there is a first level of the nonexposed permanent magnets and a second level of the nonexposed permanent magnets, the first level of nonexposed magnets are disposed inside of the second level of nonexposed magnets in the radial direction.

5. The ESP of claim 1 wherein the permanent magnets include at least 4 permanent magnets disposed in the body of the rotor wherein the permanent magnets are all separated by portions of the body of the rotor.

6. The ESP of claim 1 wherein the permanent magnets include at least 6 permanent magnets disposed in the body of the rotor wherein the permanent magnets are all separated by portions of the body of the rotor.

7. The ESP of claim 1 wherein the permanent magnets include at least 10 permanent magnets disposed in the body of the rotor wherein the permanent magnets are all separated by portions of the body of the rotor.

8. The ESP of claim 1 wherein the permanent magnets include at least 12 permanent magnets disposed in the body of the rotor wherein the permanent magnets are all separated by portions of the body of the rotor.

9. An electric submersible pump (ESP), the ESP comprising:
a motor section for driving the ESP, the motor section including:
a stator with winding channels disposed axially therein and windings disposed in the winding channels to generate a stator electromagnetic field when power is supplied to the ESP;
a rotor rotatably disposed in the stator having a body, the rotor having rotor bars disposed therein around an outer portion of the body of the rotor; and
multiple permanent magnets disposed axially in the rotor to generate a constant magnetic field wherein the stator electromagnetic field and the constant magnetic field create a two pole magnetic field for the motor section wherein at least one of the permanent magnets is an exposed permanent magnet having a portion of the at least one exposed permanent magnet exposed to an air gap between the rotor and the stator, the at least one exposed permanent magnet causing a magnetic field that is tangential to the rotor, some of the permanent magnets having a portion of the body of the rotor disposed between the permanent magnets wherein the portion of the body of the rotor disposed between the permanent magnets has a first permanent magnet disposed inside of the portion of the body of the rotor in a radial direction and a second permanent magnet disposed outside of the portion of the body of the rotor in the radial direction, the at least one exposed permanent magnet disposed in the rotor circumferentially between a plurality of the rotor bars and between nonexposed permanent magnets, and the rotor bars located radially inside of an outer radial periphery of the at least one exposed permanent magnet.

10. The ESP of claim 9 wherein some of the permanent magnets are the nonexposed permanent magnets and these nonexposed permanent magnets are disposed fully within the body of the rotor.

11. The ESP of claim 10 wherein there is a first level of the nonexposed permanent magnets and a second level of the nonexposed permanent magnets, the first level of nonexposed magnets are disposed inside of the second level of nonexposed magnets in the radial direction.

12. The ESP of claim 9 wherein the permanent magnets include at least 4 permanent magnets disposed in the body of the rotor wherein the permanent magnets are all separated by portions of the body of the rotor.

13. The ESP of claim 9 wherein the permanent magnets include at least 10 permanent magnets disposed in the body of the rotor wherein the permanent magnets are all separated by portions of the body of the rotor.

14. The ESP of claim 9 wherein the permanent magnets include at least 12 permanent magnets disposed in the body of the rotor wherein the permanent magnets are all separated by portions of the body of the rotor.

15. A method, the method comprising:
determining a layout of multiple permanent magnets disposed axially in a rotor of an electric submersible pump (ESP) to generate a desired constant magnetic field and produce a two pole magnetic field for the ESP, the ESP comprising:
a stator with winding channels disposed axially therein and windings disposed in the winding channels to generate a stator electromagnetic field when power is supplied to the ESP;
the rotor rotatably disposed in the stator having a body, the rotor having rotor bars disposed therein around an outer portion of the body of the rotor; and
the multiple permanent magnets disposed axially in the rotor to generate the constant magnetic field wherein a stator electromagnetic field and the constant magnetic field create the two pole magnetic field for the ESP wherein at least one of the permanent magnets is an exposed permanent magnet having a portion of the at least one exposed permanent magnet exposed to an air gap between the rotor and the stator, the at least one exposed permanent magnet causing a magnetic field that is tangential to the rotor, some of the permanent magnets having a portion of the body of the rotor disposed between the permanent magnets wherein the portion of the body of the rotor disposed between the permanent magnets has a first permanent magnet disposed inside of the portion of the body of the rotor in a radial direction and a second permanent magnet disposed outside of the portion of the body of the rotor in the radial direction, the at least one exposed permanent magnet disposed in the rotor circumferentially between a plurality of the rotor bars and between nonexposed permanent magnets, and the rotor bars located radially inside of an outer radial periphery of the at least one exposed permanent magnet; and constructing the ESP.

16. The method of claim 15 wherein some of the permanent magnets are the nonexposed permanent magnets and these nonexposed permanent magnets are disposed fully within the body of the rotor.

17. The method of claim 16 wherein there is a first level of the nonexposed permanent magnets and a second level of the nonexposed permanent magnets, the first level of nonexposed magnets are disposed inside of the second level of nonexposed magnets in the radial direction.

18. The method of claim 15 wherein the permanent magnets include at least 6 permanent magnets disposed in the body of the rotor wherein the permanent magnets are all separated by portions of the body of the rotor.

* * * * *